(12) United States Patent
Honjo (10) Patent No.: US 6,640,651 B2
(45) Date of Patent: Nov. 4, 2003

(54) TORQUE DETECTOR

(75) Inventor: Hisashi Honjo, Moriguchi (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 09/981,908

(22) Filed: Oct. 19, 2001

(65) Prior Publication Data

US 2002/0050177 A1 May 2, 2002

(30) Foreign Application Priority Data

Nov. 2, 2000 (JP) .......................................... 2000-335614

(51) Int. Cl.⁷ ................................................. G01L 3/00
(52) U.S. Cl. ..................................... 73/862.08; 73/862
(58) Field of Search .............................. 73/862, 862.08, 73/862.321, 862.338

(56) References Cited

U.S. PATENT DOCUMENTS

| | | | | |
|---|---|---|---|---|
| 5,046,372 A | * | 9/1991 | Taniguchi et al. | 73/862.335 |
| 5,253,725 A | * | 10/1993 | Nishimoto | 180/446 |
| 5,765,661 A | * | 6/1998 | Matsuoka | 180/446 |
| 5,796,014 A | * | 8/1998 | Chikaraishi et al. | 73/862.331 |
| 6,237,428 B1 | * | 5/2001 | Odachi et al. | 73/862.333 |
| 6,260,422 B1 | * | 7/2001 | Odachi et al. | 73/862.334 |
| 6,439,066 B1 | * | 8/2002 | Norton | 73/862.333 |

* cited by examiner

*Primary Examiner*—Edward Lefkowitz
*Assistant Examiner*—Andre Allen
(74) *Attorney, Agent, or Firm*—Shinjyu Global IP Counselors, LLP (57) ABSTRACT

The present invention makes it possible to detect efficiently and accurately small torque. A torque detector includes a first shaft portion (first torque detecting portion), a first strain gage, a second shaft portion (second torque detecting portion), and a second strain gage. The first strain gage is provided on the first shaft portion. The second shaft portion has lower rigidity than the first shaft portion. The second torque sensor is provided on the second shaft portion to measure smaller torque than the first strain gage.

20 Claims, 8 Drawing Sheets

TORQUE DETECTOR

BACKGROUND OF THE INVENTION

1. Field of the Invention

The present invention relates to a torque detector.

2. Background Information

In order to conduct a characteristic evaluation of a rotation powertrain of a vehicle, a test using a torque detector in which torque measurement of the rotation powertrain is conducted is necessary. The torque detector is formed of a rotary shaft and a plurality of strain gages attached to a surface of a torque detecting portion of the rotary shaft. Respective strain gages form resistors of a resistance bridge circuit in a torque arithmetic portion. The strain gages detect the magnitude of shear stress generated on the surface of the rotary shaft due to torque applied to the rotary shaft. The torque arithmetic portion converts the magnitude of change of the output voltage appearing in the resistance bridge circuit with respect to the input voltage to torque.

In order to detect torque by using one torque detector, the detector needs to include a torque detecting portion adapted for maximum torque. In this case, the accuracy of small torque detection is reduced. Therefore, in order to detect accurately a small torque, it is necessary to prepare a plurality of torque detecting portions and to change the torque detecting portion for every measurement. However, changing the operation of the torque detection portion is complicated and reduces the operation efficiency of the test.

In view of the above, there exists a need for a torque detector that overcomes the above mentioned problems in the prior art. This invention addresses this need in the prior art as well as other needs, which will become apparent to those skilled in the art from this disclosure.

SUMMARY OF THE INVENTION

It is an object of the present invention to make it possible to detect efficiently and accurately small torque.

A torque detector according to a first aspect of the present invention has, a first torque detecting portion, a first torque sensor, a second torque detecting portion, and a second torque sensor. The first torque sensor is provided on the first torque detecting portion to detect torque. The second torque detecting portion has lower rigidity than the first torque detecting portion. The second torque sensor is provided to the second torque detecting portion and detects torque that is smaller than the torque detected by the first torque sensor. In the torque detector, the second torque sensor detects small torque and the first torque sensor detects large torque. Therefore, it is unnecessary to change the torque detecting portion, and it is possible to detect efficiently and accurately small torque.

A torque detector according to a second aspect of the present invention is a torque detector of the first aspect and further includes a stopper portion. The stopper portion stops torsional operation of the second torque detecting portion when a predetermined torsion angle is obtained. In the torque detector of the second aspect, if the torsion angle reaches a predetermined angle, the stopper portion stops the torsional operation of the second torque detecting portion and torque is not transmitted thereafter by the second torque detecting portion. In other words, the second torque detecting portion is protected while the large torque is detected by the first torque detecting portion.

A torque detector according to a third aspect of the present invention has a first torque detecting portion, a first torque sensor, a second torque detecting portion, a second torque sensor, and a stopper portion. The first torque sensor is provided for the first torque detecting portion to detect torque. The second torque detecting portion is disposed to operate in series with the first torque detecting portion in a rotating direction and has a lower rigidity than the first torque detecting portion. The second torque sensor is provided for the second torque detecting portion and detects smaller torque than the first torque sensor detects. The stopper portion is disposed to operate in parallel with the second torque detecting portion in the rotating direction. The stopper portion stops torsional operation of the second torque detecting portion when a predetermined torsion angle is obtained.

In the torque detector of the third aspect, the second torque detecting portion is twisted, and the second torque sensor detects small torque in a small torsion angle region. When the torsion angle reaches the predetermined angle, the stopper portion stops the torsional operation of the second torque detecting portion. Torque is thereafter transmitted through the stopper portion allowing the first torque sensor to detect large torque with the first torque detecting portion.

In the torque detector of the third aspect, the second torque sensor detects small torque and the first torque sensor detects large torque. Therefore, it is unnecessary to change the torque detecting portion and it is possible to detect small torque efficiently and accurately. The second torque detecting portion is protected by the stopper portion while the large torque is detected by the first torque detecting portion.

A torque detector according to a fourth aspect of the present invention has a first member, a first torque sensor, a second torque sensor, a second member, and a stopper portion. The first member includes a first torque detecting portion and a second torque detecting portion. The second torque detecting portion operates in series with the first torque detecting portion in a rotating direction and has a lower rigidity than the first torque detecting portion. The first torque sensor is provided for the first torque detecting portion. The second torque sensor is provided for the second torque detecting portion to detect torque smaller than that which the first torque sensor detects. The second member is disposed close to the first member. The stopper portion is disposed in parallel with the second torque detecting portion in the rotating direction. The stopper portion is arranged to transmit torque between the second member and the first torque detecting portion. The stopper portion is also arranged to prevent transmission of torque until a predetermined torsion angle is obtained.

In the torque detector of the fourth aspect, if the first member rotates, for example, torque of the first member is transmitted to the second member through the first torque detecting portion and the second torque detecting portion of the first member. The second torque sensor detects small torque with the second torque detecting portion in a region of a small torsion angle. When the torsion angle reaches the predetermined angle, the stopper portion starts torque transmission. In other words, torque of the first member is transmitted to the second member through the first torque detecting portion and then to the first torque transmitting portion, preferably in that order. The first torque sensor thereby detects large torque with the first torque detecting portion.

In the torque detector, the second torque sensor detects small torque and the first torque sensor detects large torque. Therefore, it is unnecessary to change the torque detecting portion, and it is possible to detect small torque efficiently and accurately. The second torque detecting portion is protected by the stopper portion while the large torque is detected in the first torque detecting portion.

In a torque detector according to a fifth aspect of the present invention, the second torque detecting portion of the torque detector of the fourth aspect has an elastic member which can be contracted in the rotating direction between the first member and the second member.

In a torque detector according to a sixth aspect, the torque detector of the fifth aspect is arranged so that initial torque is applied to the elastic member.

In this torque detector, the elastic member is not contracted in the rotating direction until torsional torque exceeds the initial torque of the elastic member. In other words, the first member and the second member rotate together and frictional resistance is not generated between both the members until that time. As a result, the second torque sensor can accurately detect minute torque.

A torque detector according to a seventh aspect includes a first member, a first torque sensor, a second torque sensor, a second member, and a stopper portion. The first torque sensor is provided for the first torque detecting portion. The second torque sensor is provided for the second torque detecting portion and is configured to detect smaller torque than the torque for which the first torque sensor is configured. The first member includes a shaft-shaped first torque detecting portion, a second torque detecting portion, and a flange. The second torque detecting portion is provided on a tip end of the first torque detecting portion and has a lower rigidity than the first torque detecting portion. The flange is formed between the first torque detecting portion and the second torque detecting portion. The second member is connected in a rotating direction to the first member through the second torque detecting portion. The stopper portion is formed between the second member and the flange to prevent transmission of torque until a torsion angle between the first member and the second member reaches a predetermined angle.

In this torque detector, if the first member rotates with respect to the second member, the second torque sensor detects small torque with the second torque detecting portion in a small torsion angle region. When the torsion angle reaches the predetermined angle, torque transmission is started by the stopper portion and torsional operation of the second torque detecting portion is stopped. In other words, torque is thereafter transmitted through the stopper portion and the first torque sensor detects large torque with the first torque detecting portion.

In this torque detector, the second torque sensor detects small torque and the first torque sensor detects large torque. Therefore, it is unnecessary to change the torque detecting portion and it is possible to detect small torque efficiently and accurately. The second torque detecting portion is protected by the stopper portion while the large torque is detected in the first torque detecting portion.

In a torque detector according to an eighth aspect, the second torque detecting portion of the torque detector of the seventh aspect has an elastic member which can be contracted in the rotating direction between the first member and the second member.

In a torque detector according to a ninth aspect, the torque detector of the eighth aspect is configured so that initial torque is applied to the elastic member. In this torque detector, the elastic member is not contracted in the rotating direction until torsional torque exceeds the initial torque of the elastic member. In other words, the first member and the second member rotate together and frictional resistance is not generated between both the members until that time. As a result, the second torque sensor can accurately detect minute torque.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
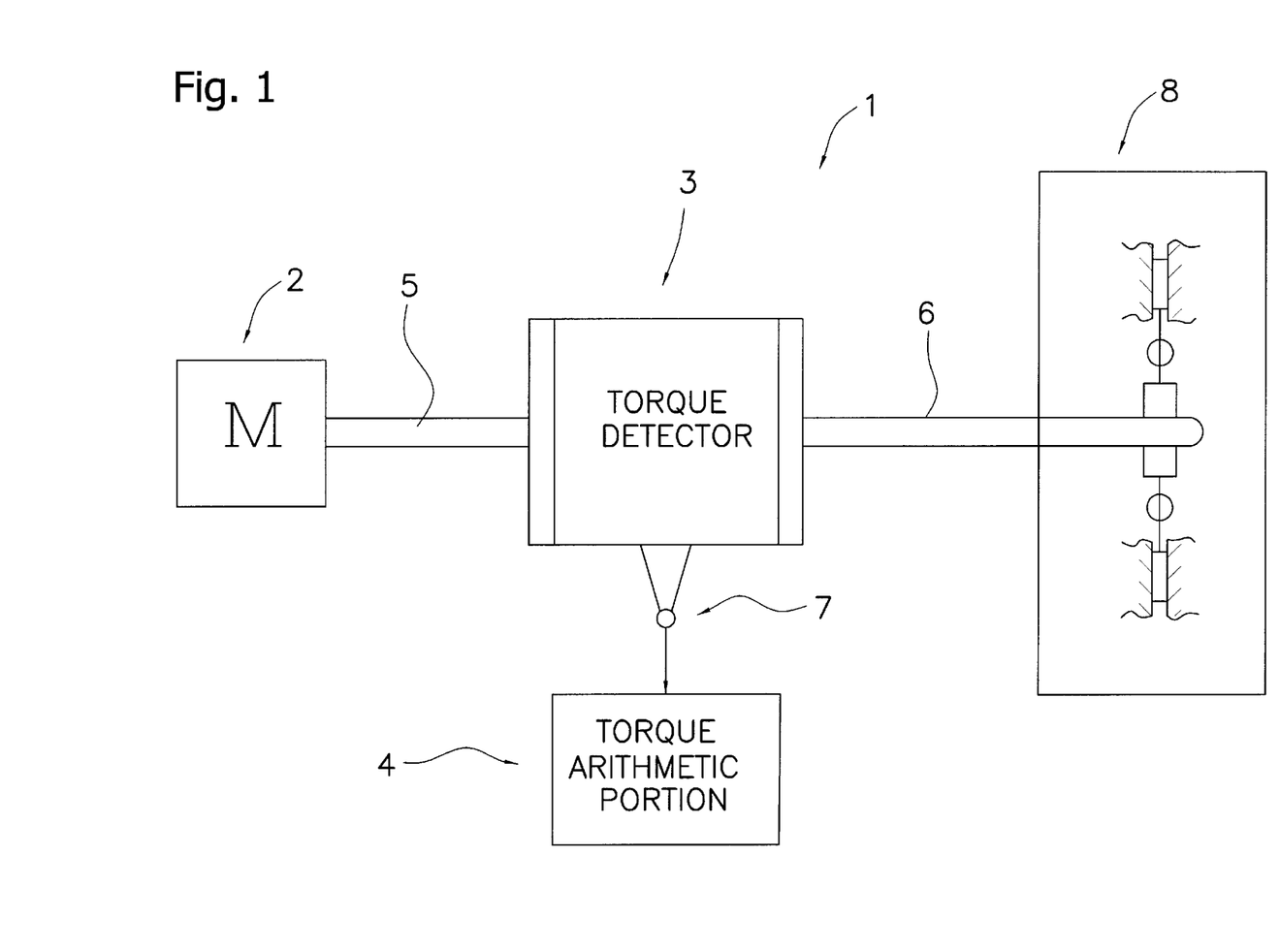
FIG. 1 is a view of a general schematic diagram of a torque measuring system in accordance with a preferred embodiment of the present invention.

FIG. 1 shows a torque measuring system 1 in accordance with a preferred embodiment of the present invention. In the present embodiment, the torque measuring system 1 is a system for measuring torsion characteristics of an object 8 (e.g., a clutch disc assembly), which is a part of a rotation powertrain. The torque measuring system 1 is mainly formed of a motor 2, which is a torque generating source, a torque detector 3, and a torque arithmetic portion 4. The motor 2 and the torque detector 3 are connected by a first shaft 5. The torque detector 3 and the object 8 are connected by a second shaft 6. An end of the shaft 6 is preferably inserted into a hub of the clutch disc assembly. An electric signal obtained by the torque detector 3 is supplied to the torque arithmetic portion 4 through a line 7.

The torque detector 3 will be described referring to FIGS. 2 to 7. The torque detector 3 includes a first flange member 10, a second flange member 11, a first torque transmitting portion 13, and a second torque transmitting portion 14. The first flange member 10 is connected to the first shaft 5. The second flange member 11 is connected to the second shaft 6. The first torque transmitting portion 13 connects the first flange member 10 and the second flange member 11 in a rotating direction. The second torque transmitting portion 14 connects the first flange member 10 and the second flange member 11 in the rotating direction. The torque detector 3 rotates about a rotational axis O—O shown in FIG. 2. In the following description, an axial direction will be referred in vertical direction based on FIG. 2 for the sake of convenience.

Figure 2:
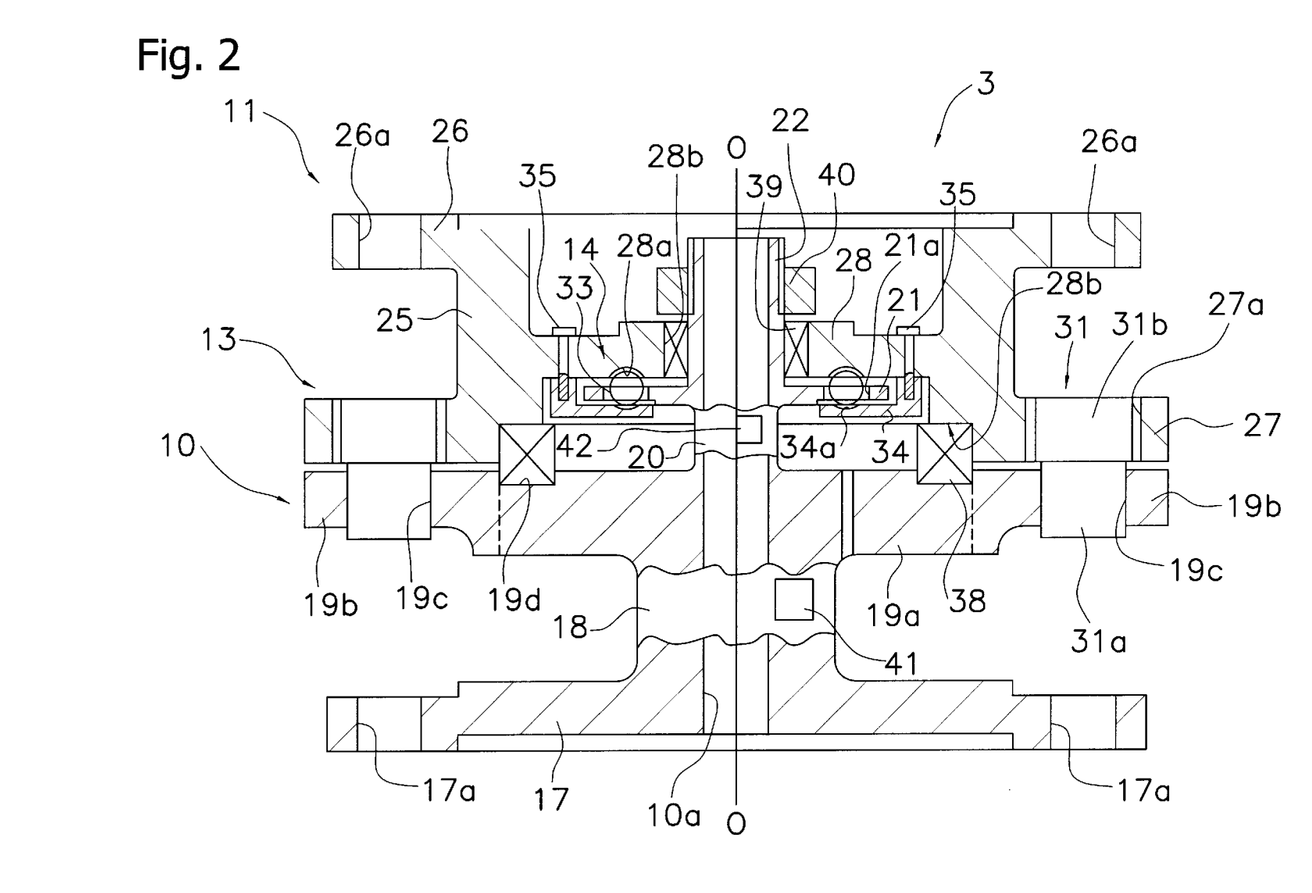
FIG. 2 is an elevational sectional schematic view of a torque detector in accordance with a preferred embodiment of the present invention.
Figure 3:
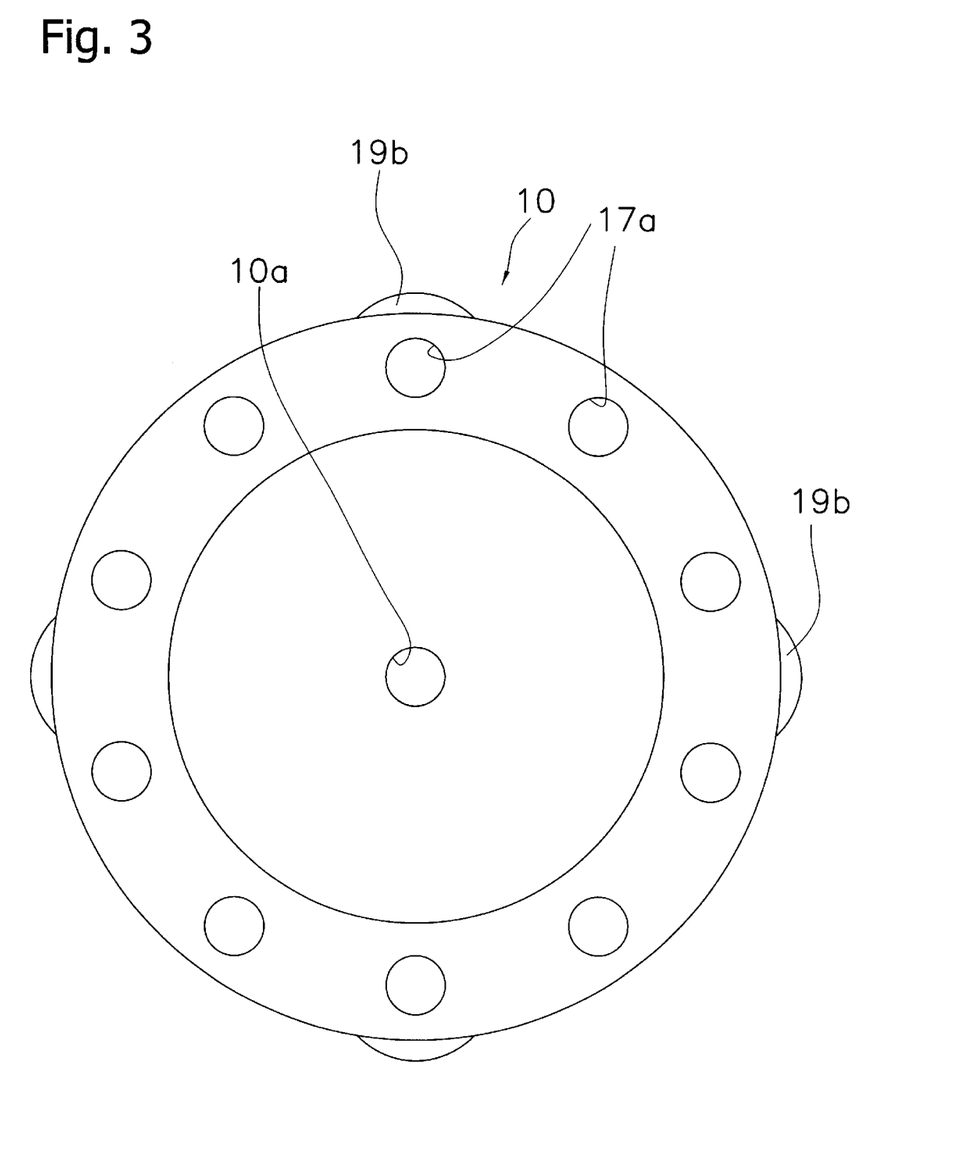
FIG. 3 is a bottom plan view of a first flange member of the torque detector of FIG. 2.

The first flange member 10 is formed of a first flange 17, a first shaft portion 18, a second flange 19, a second shaft portion 20, a third flange 21, and a third shaft portion 22. The first flange 17 is fixed to the first shaft 5. The first shaft portion 18 axially extends from a center of the first flange 17. The second flange 19 is formed at the other end of the first shaft portion 18 opposite the first flange 17. The second shaft portion 20 axially extends from a center of the second flange 19. The third flange 21 extends from the other end of the second shaft portion 20 opposite the second flange 19. The third shaft portion 22 axially extends from a center of the third flange 21. A plurality of holes 17a, into which bolts (not shown) for fixing the first flange 17 to the first shaft 5 are inserted, is formed in the first flange 17.

The first shaft portion 18 (the first torque detecting portion) has a circular-cylindrical shape with a relatively large diameter. A plurality of first strain gages 41 (first torque sensors) is arranged on a periphery of the first shaft portion 18. The first strain gages 41 are connected to the torque arithmetic portion 4 through the above-described line 7.

Figure 4:
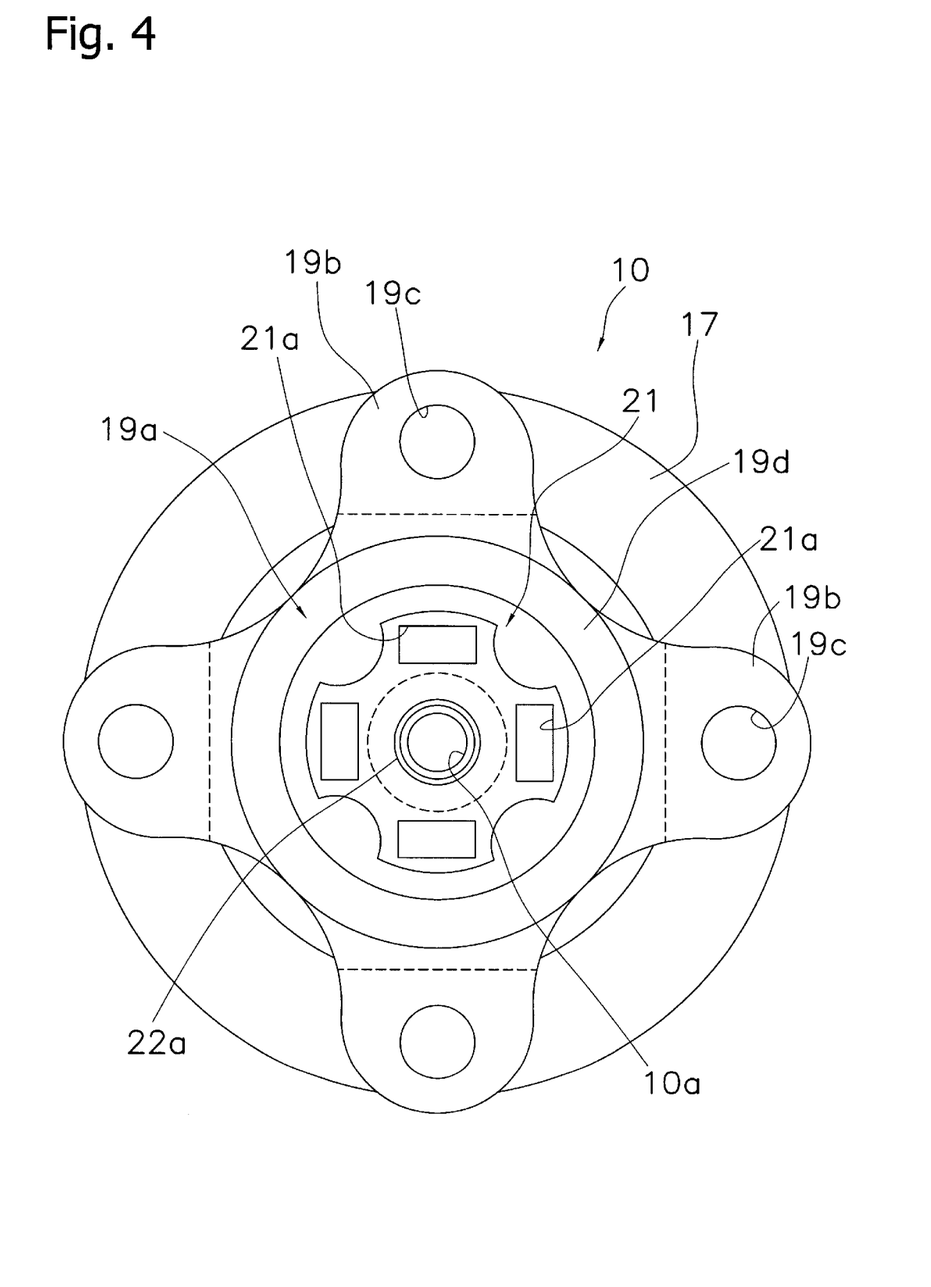
FIG. 4 is a top plan view of the first flange member.

The second flange 19 is formed of an annular portion 19a on an inner periphery side and a plurality of preferably four projecting portions 19b projecting radially outward from an outer peripheral edge of the annular portion 19a as seen in FIG. 4. Circular holes 19c axially passing through the respective projecting portions 19b are formed on the projecting portions 19b. An annular groove 19d is formed on an upper face of the second flange 19, and preferably, at an outer peripheral edge of the upper face of the annular portion 19a.

Referring to FIG. 2, the second shaft portion 20 (the second torque detecting portion) has a circular-cylindrical shape that is thinner than the first shaft portion 18, and has a diameter which is preferably about one-third that of the first shaft portion 18. Therefore, the second shaft portion 20 has lower rigidity in a torsion direction than the first shaft portion 18. A plurality of second strain gages 42 (second torque sensors) is arranged on a periphery of the second shaft portion 20. The second strain gages 42 are connected to the torque arithmetic portion 4 through the above-described line 7. Signals from the first strain gages 41 and signals from the second strain gages 42 are selected by a switch provided to the line 7 and output to the torque arithmetic portion 4.

The third flange 21 is formed at a tip end of the second shaft portion 20. The third flange 21 preferably has a substantially smaller radial dimension and axial thickness than the first and second flanges 17 and 19. As seen in FIG. 4, the third flange 21 is formed with a plurality of window holes 21a arranged in a rotating direction. The window holes 21a are axial through holes extending in the rotating direction.

Referring again to FIG. 2, the third shaft portion 22 further extends in an axial direction from the second shaft portion 20. As seen in FIG. 4, a thread 22a, with which a connecting nut 40, described later, is engaged, is formed at a periphery of the third shaft portion 22. A central hole 10a axially passing through the entire first flange member 10 is formed at a center of the first flange member 10.

Figure 5:
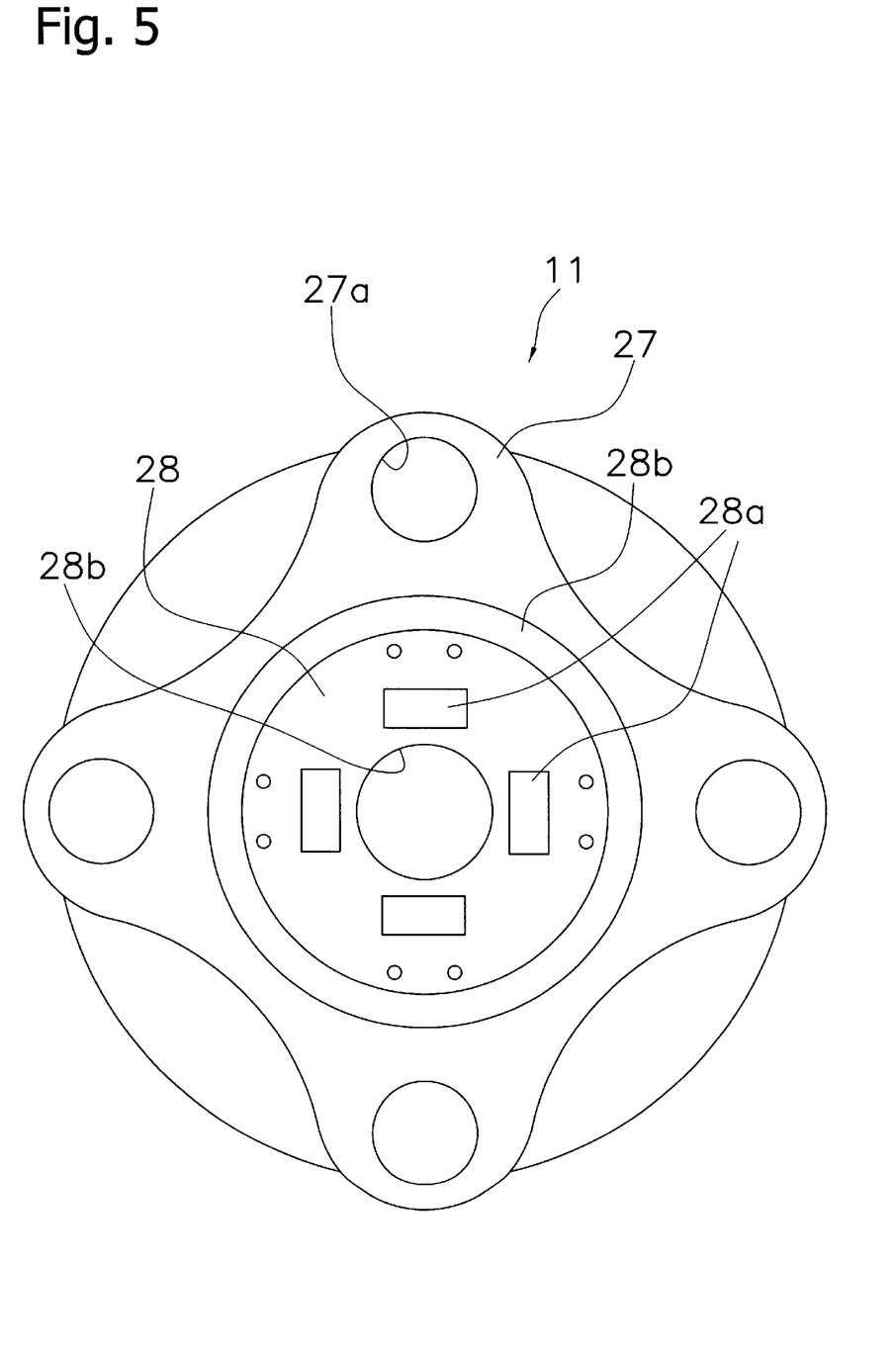
FIG. 5 is a bottom plan view of a second flange member of the torque detector of FIG. 2.
Figure 6:
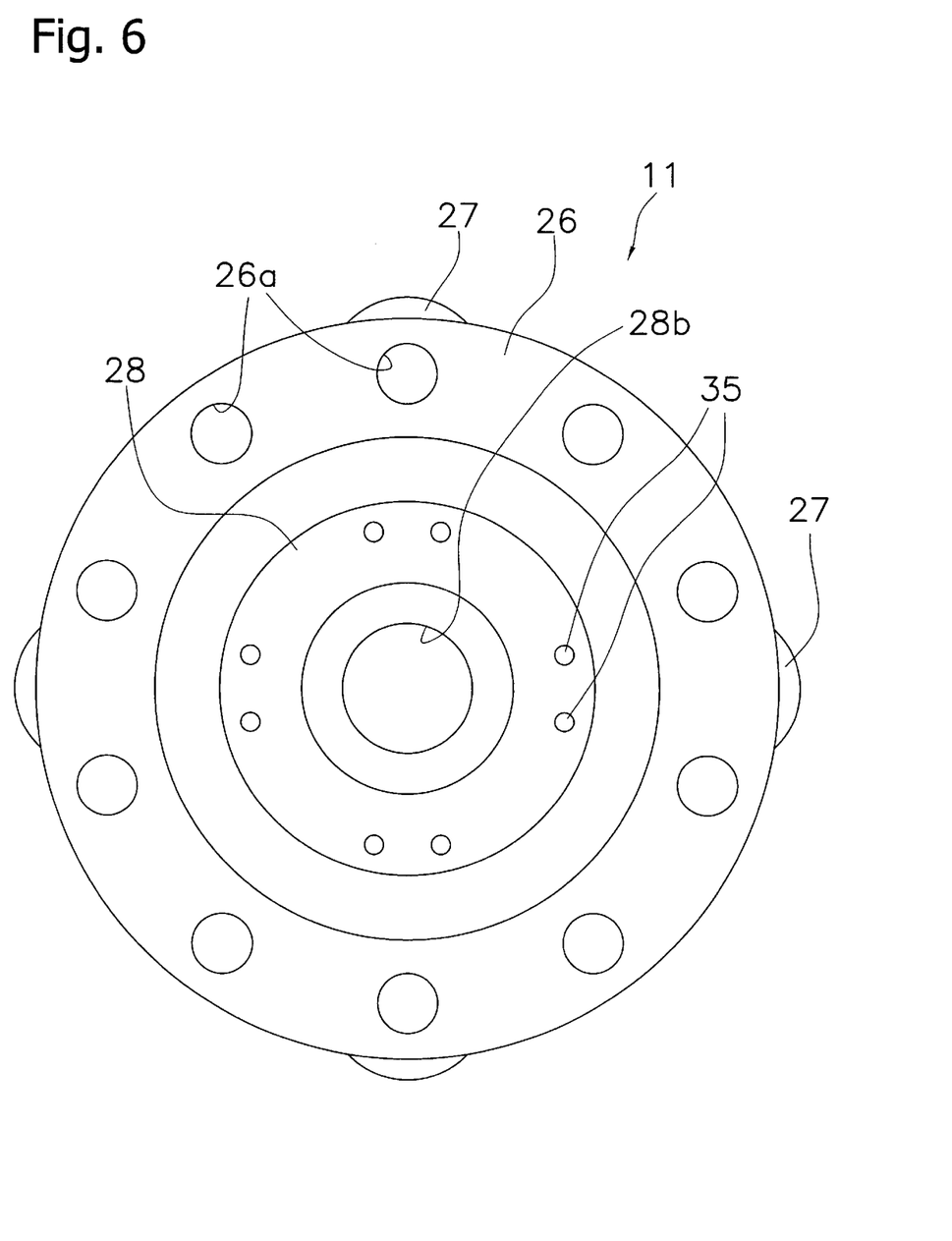
FIG. 6 is a top plan view of the second flange member.

The second flange member 11 is disposed close to a peripheral portion of the first flange member 10. The second flange member 11 is mainly formed of a tubular portion 25, a first flange 26, second flanges 27, and a third flange 28. The tubular portion 25 is disposed with large gaps between the tubular portion 25 and peripheries of the second and third shaft portions 20 and 22 of the first flange member 10. The first flange 26 is formed at a peripheral end of the tubular portion 25 and fixed to the second shaft 6. As seen in FIG. 6, the first flange 26 is formed with a plurality of holes 26a through which bolts (not shown) for fixing the first flange 26 to the second shaft 6 pass. As seen in FIG. 2, the second flanges 27 are formed opposite the first flange 26, extend from the tubular portion 25, and disposed close to the first flange member 10. Referring now to FIGS. 2 and 5, the second flanges 27 are a plurality of projecting portions projecting radially outward from the tubular portion 25 and disposed to correspond to the projecting portions 19b of the first flange member 10. The respective second flanges 27 are formed with holes 27a axially passing through the second flanges 27. The holes 27a are circular and concentric with the holes 19c of the projecting portions 19b. The holes 27a preferably have larger diameters than the holes 19c.

Figure 7:
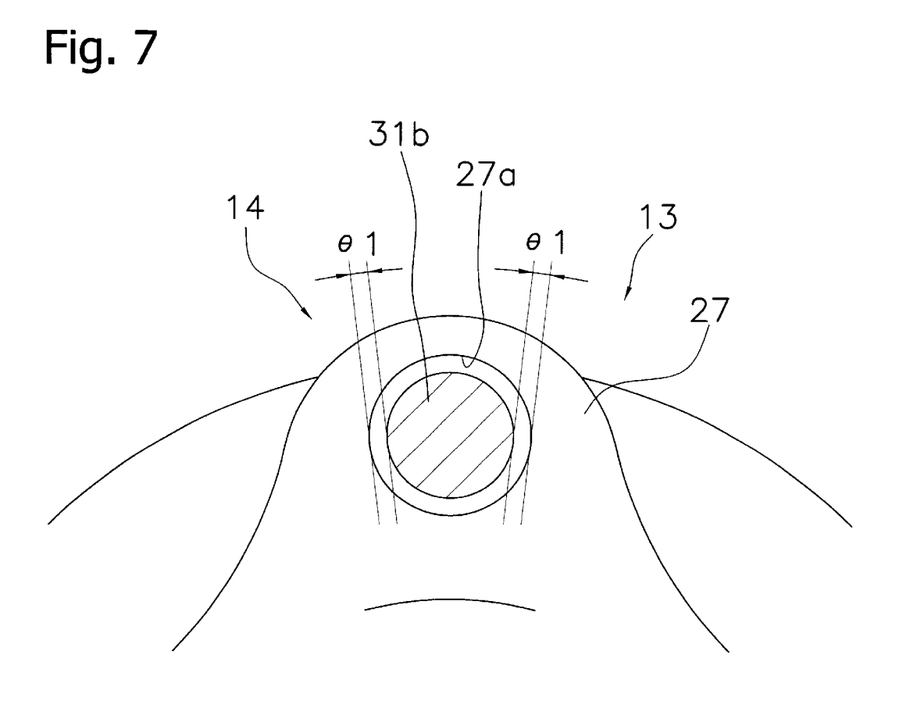
FIG. 7 is a partial cross-sectional view illustrating a first torque transmitting portion.

As seen in FIG. 2, pins 31 are disposed in the holes 19c and 27a. Each pin 31 is a circular-cylindrical member formed of a small-diameter portion 31a and a large-diameter portion 31b. The small-diameter portion 31a is inserted and fitted in the hole 19c. The large-diameter portion 31b is disposed in the hole 27a. Since the large-diameter portion 31b has a smaller diameter than the hole 27a and is disposed at a center of the hole 27a, a gap is maintained between an outer peripheral face of the large-diameter portion 31b and an inner peripheral face of the hole 27a as shown in FIG. 7. As a result, the large-diameter portion 31b can move through a predetermined angle θ1 to each side in the rotating direction with respect to the hole 27a. In other words, the first torque transmitting portion 13 is formed by the pins 31 and holes 27a, and does not transmit torque until a predetermined torsion angle between the first flange member 10 and the second flange member 11 is reached. Thereafter, the first transmitting portion 13 transmits torque.

As seen in FIG. 2, the third flange 28 extends radially inward from an axial intermediate portion of the tubular portion 25. A central hole 28b is formed at a center of the third flange 28. The third shaft portion 22 of the first flange member 10 extends in the central hole 28b. The third flange 28 is disposed close to the third flange 21 of the first flange member 10. Recessed portions 28a corresponding to the window hole 21a are formed on a lower face of the third flange 28. A plurality of retaining plates 34 is fixed to the lower face of the third flange 28 by bolts 35 to correspond to the recessed portions 28a and the window holes 21a. The retaining plates 34 are disposed below the third flange 21, and each has a recessed portion 34a corresponding to the recessed portion 28a and the window hole 21a on an upper face.

An elastic member 33 is disposed in each space formed by the above-described recessed portion 28a, window hole 21a, and recessed portion 34a. The elastic member 33 is preferably a spring, and more preferably a coil spring, extending in the rotating direction. Opposite ends of the elastic member 33 in the rotating direction are preferably in contact with edge portions in the rotating direction of the recessed portion 28a, the window hole 21a, and the recessed portion 34a. An axial upper side of the elastic member 33 is supported by the recessed portion 28a, and an axial lower side of the elastic member 33 is supported by the recessed portion 34a. When the third flange 21 and the third flange 28 rotate with respect to each other, each elastic member 33 is contracted between the edges in the rotating direction of the recessed portions 28a and 34a and an opposite edge in the rotating direction of the window hole 21a.

Each elastic member 33 is preferably disposed in each recessed portion 28a, window hole 21a, and recessed portion 34a, in a state in which the elastic member 33 is contracted in advance in the rotating direction. In other words, initial torque is preferably applied to the elastic member 33. The elastic member 33 cannot be further contracted in the rotating direction by torque smaller than the initial torque.

The above-described structures and disposition of the elastic members 33 form the second torque transmitting portion 14 between the first flange member 10 and the second flange member 11. The second torque transmitting portion 14 is disposed in a manner to transmit torque between the first shaft portion 18 through the second shaft portion 20, i.e., disposed in series with the second shaft portion 20. Furthermore, the second torque transmitting portion 14 is disposed in parallel with the first torque transmitting portion 13 with respect to the first shaft portion 18.

It can be said that the elastic members 33 form a part of the second torque detecting portion formed of the second shaft 20 because the elastic members 33 are disposed in series with the second shaft portion 20 in the rotating direction.

A first bearing 38 is disposed between the second flange 19 of the first flange member 10 and the tubular portion 25 of the second flange member 11. In other words, the first bearing 38 is preferably disposed in the groove 19d of the second flange 19 and is in contact with a lower face of the tubular portion 25 of the second flange member 11. As a result, the first bearing 38 receives a thrust load between the first flange member 10 and the second flange member 11.

A second bearing 39 is disposed between an outer peripheral face of the third shaft portion 22 and the central hole 28b of the third flange 28. The second bearing 39 receives a radial load between the first flange member 10 and the second flange member 11. Moreover, a connecting nut 40 is engaged with a tip end of the third shaft portion 22. The connecting nut 40 is disposed axially next to the third flange 28 and the second bearing 39 and connects the first flange member 10 and the second flange member 11 such that the members 10 and 11 cannot be detached in the axial direction.

Next, operation of the torque measuring system 1 will be described as seen in FIG. 1. When the motor 2 rotates, torque of the motor 2 is transmitted to the first shaft 5, the torque detector 3, and the second shaft 6 and finally to the object 8, preferably in that order. If torsional operation is generated in the object 8, torque detected by the torque detector 3 and an arithmetic operation for obtaining torque is performed in the torque arithmetic portion 4.

Figure 8:
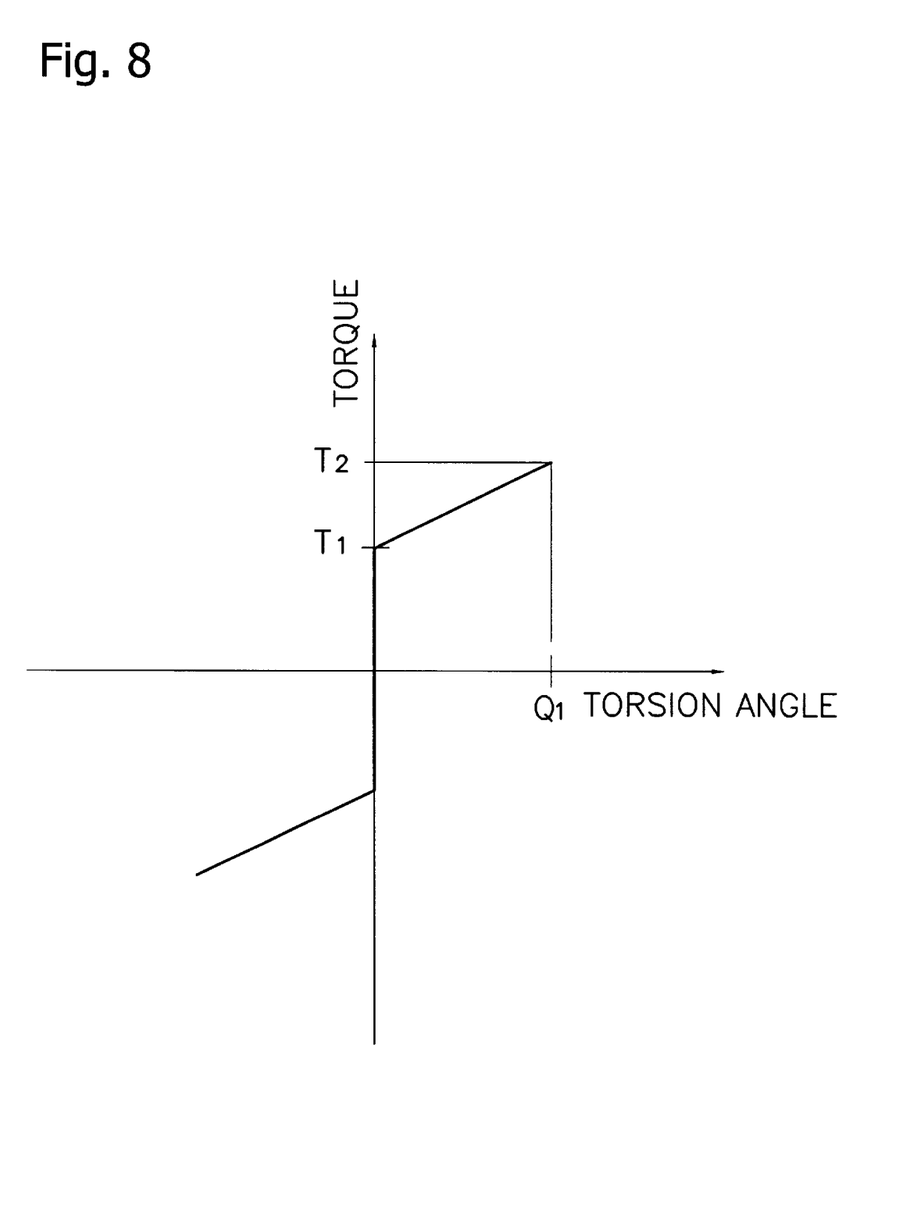
FIG. 8 is a diagrammatical view of torsional characteristics of elastic members in accordance with a preferred embodiment of the present invention.

Operation of the torque detector 3 will be described. FIG. 8 is a diagrammatical view of torsional characteristics of the elastic members 33 of the second torque transmitting portion 14. If initial torque of the elastic members 33 is defined as T1, the torsion angle is maintained at 0 when torque applied to the elastic members 33 is smaller than the initial torque. Referring to the aforementioned FIG. 2, the elastic members 33 are not contracted and the first flange member 10 and the second flange member 11 rotate together. In other words, relative rotation is not generated between both of the members and resistance is not generated at the first bearing 38 and the second bearing 39. As a result, accuracy of minute torque detection by the second strain gages 42 is enhanced. If the torsional torque exceeds the initial torque T1, the elastic members 33 are contracted and a torsional characteristic according to a spring constant of the elastic members 33 is obtained. During the above operation, torque of the first flange member 10 is transmitted to the second flange member 11 through the first shaft portion 18, the second shaft portion 20, and the second torque transmitting portion 14, preferably in that order.

Referring now to FIGS. 2 and 7, after the pins 31 come in contact with the holes 27a in the first torque transmitting portion 13, torque is output from the first flange member 10 to the second flange member 11 through the second flange 19 and the pins 31. In other words, the elastic members 33 are not further contracted in the second torque transmitting portion 14 and a degree of torsion at the second shaft portion 20 is not increased. During the above operation, torque of the first flange member 10 is transmitted to the second flange member 11 through the first shaft portion 18, the second flange 19, and the first torque transmitting portion 13, preferably in that order. In this manner, the first torque transmitting portion 13 functions as a stopper portion for allowing operation of the second torque transmitting portion 14, which will be described later, to a predetermined angle and stops the operation when the predetermined angle is exceeded. In other words, referring now to FIG. 1, the torque transmitting paths of this torque detector 3 are the second torque transmitting portion 14 and the second shaft portion 20 when the torsion angle is small, i.e., when torque is small and the first torque transmitting portion 13 when the torsion angle becomes large i.e., when torque becomes large. As a result, large torque is not applied to the second torque transmitting portion 14 and the second shaft portion 20 and breakage or the like of these portions is not caused.

By providing the plurality of torque detecting portions, it is possible to detect efficiently and accurately small torque. In other words, it is possible to detect accurately a plurality of degrees of torque by using the one torque detector. Thus, changing the torque detecting portion is unnecessary.

By providing the stopper portion, the small torque detecting portion is protected in detection of large torque. In other words, breakage or the like of the small torque detecting portion is not caused.

Although the torque detector includes two kinds of torque detecting portions in the above embodiment, the torque detector may include three or more kinds of torque detecting portions. In this case, detection can be carried out with accuracy according to detected torque.

It is also possible to provide the first flange member on an output side and that the second flange member is provided on an input side.

The torque sensor is not limited to the strain gage.

Since the torque detector according to the invention includes the first torque detecting portion and the second torque detecting portion, it is unnecessary to change the torque detecting portion and it is possible to efficiently and accurately detect small torque.

The terms of degree such as "substantially," "about," and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A torque detector comprising:
   a first torque detecting portion having a predetermined rigidity;
   a first torque sensor being arranged to contact said first torque detecting portion to detect a first torque, said first torque being received by said first torque detecting portion;
   a second torque detecting portion having a lower rigidity than said first torque detecting portion, said second torque detecting portion being fixed to said first torque detecting portion; and
   a second torque sensor being arranged to contact said second torque detecting portion to detect a second torque, said second torque being smaller than that which said first torque sensor detects.

2. The torque detector according to claim 1 further comprising a stopper portion for stopping torsional operation of said second torque detecting portion when a predetermined torsion angle is obtained.

3. A torque detector comprising:
   a first torque detecting portion having a predetermined rigidity;
   a first torque sensor being arranged to contact said first torque detecting portion to detect a first torque, said first torque being received by said first torque detecting portion;
   a second torque detecting portion disposed to operate in series with said first torque detecting portion in a rotating direction and having lower rigidity than said first torque detecting portion;
   a second torque sensor being arranged to contact said second torque detecting portion to detect a second torque, said second torque being smaller than that which said first torque sensor detects; and
   a stopper portion disposed to operate in parallel with said second torque detecting portion in the rotating direction to stop torsional operation of said second torque detecting portion when a predetermined torsion angle is obtained.

4. A torque detector comprising:
   a first member including a first torque detecting portion having a predetermined rigidity and a second torque detecting portion disposed to operate in series with said first torque detecting portion in a rotating direction and having lower rigidity than said first torque detecting portion;
   a first torque sensor being arranged to contact said first torque detecting portion to detect a first torque, said first torque being received by said first torque detecting portion;
   a second torque sensor being arranged to contact said second torque detecting portion to detect a second torque, said second torque being smaller than that which said first torque sensor detects;
   a second member disposed close to said first member; and
   a stopper portion in parallel with said second torque detecting portion in the rotating direction to transmit torque between said second member and said first torque detecting portion and to prevent transmission of torque until a predetermined torsion angle is obtained.

5. The torque detector according to claim 4, wherein said second torque detecting portion has an elastic member which contracts in the rotating direction between said first member and said second member.

6. The torque detector according to claim 5, wherein said elastic member is a spring.

7. The torque detector according to claim 5, wherein initial torque is applied to said elastic member.

8. A torque detector comprising:
   a first member having
      a cylindrical first torque detecting portion having a predetermined rigidity,
      a second torque detecting portion provided on an tip end of said first torque detecting portion and having lower rigidity than said first torque detecting portion; and
      a first flange formed between said first torque detecting portion and said second torque detecting portion;
   a first torque sensor being arranged to contact said first torque detecting portion to detect a first torque, said first torque being received by said first torque detecting portion;
   a second torque sensor being arranged to contact said second torque detecting portion to detect a second torque, said second torque being smaller than that which said first torque sensor detects;
   a second member connected in a rotating direction to said first member through said second torque detecting portion; and
   a stopper portion formed between said second member and said first flange to prevent transmission of torque until a torsion angle between said first member and said second member reaches a predetermined angle.

9. The torque detector according to claim 8, wherein said second torque detecting portion has an elastic member which can be contracted in the rotating direction between said first member and said second member.

10. The torque detector according to claim 9, wherein said elastic member is a spring.

11. The torque detector according to claim 9, wherein an initial torque is applied to said elastic member.

12. The torque detector according to claim 8, wherein said stopper portion comprises a gap to prevent transmission of torque until a predetermined angle has been reached in the rotational direction between said first torque detecting portion and said second torque detecting portion.

13. The torque detector according to claim 12, wherein said stopper portion comprises a pin.

14. The torque detector according to claim 13, wherein said second member has a second flange arranged opposite said first flange.

15. The torque detector according to claim 14, wherein said first flange has a first aperture.

16. The torque detector according to claim 15, wherein said second flange has a second aperture.

17. The torque detector according to claim 16, wherein said pin is inserted into said first and second apertures.

18. The torque detector according to claim 17, wherein said pin comprises a large diameter portion and a smaller diameter portion.

19. The torque detector according to claim 18, wherein said large diameter portion has a diameter that is larger than a diameter of said first aperture.

20. The torque detector according to claim 19, wherein said diameter of said large diameter portion is smaller than a diameter of said second aperture so that a gap is arranged in the rotating direction.

* * * * *